P. H. STANDISH.
Thrashing Machine.

No. 33,109. Patented Aug. 20, 1861.

Witnesses:

Inventor:

UNITED STATES PATENT OFFICE.

P. H. STANDISH, OF SANTA CLARA, CALIFORNIA.

THRESHING-MACHINE.

Specification of Letters Patent No. 33,109, dated August 20, 1861.

*To all whom it may concern:*

Be it known that I, P. H. STANDISH, of Santa Clara, in the county of Santa Clara and State of California, have invented a new and Improved Grain Threshing and Separating Machine; and I do hereby declare that the following is a full, clear, and exact description of the same, reference being had to the annexed drawings, making a part of this specification, in which—

Figure 1:
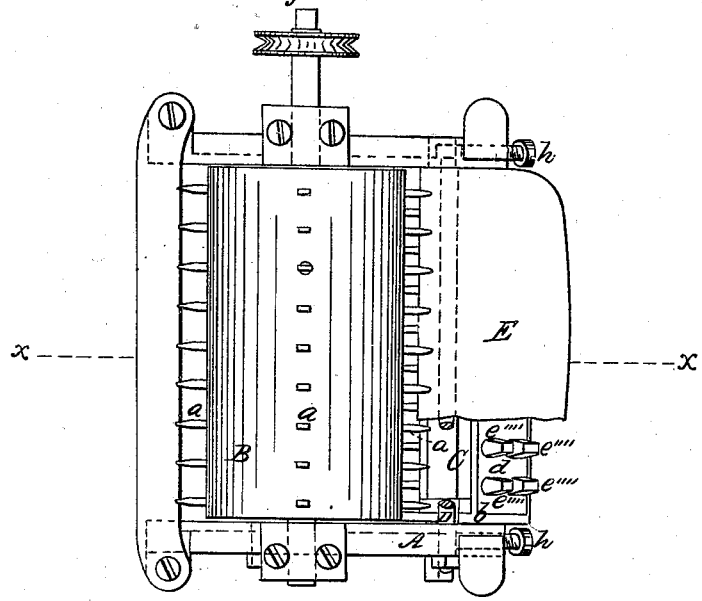
Figure 2:
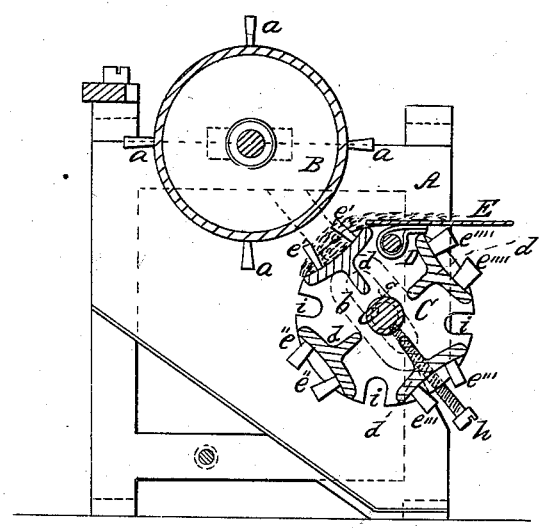

Figure 1 is a plan or top view of my invention. Fig. 2, a side sectional view of ditto, taken in the line $x$, $x$, Fig. 1.

Similar letters of reference indicate corresponding parts in the two figures.

The object of this invention is to obtain a grain-threshing and separating machine which will admit of being adjusted so as to operate perfectly on different kinds of grain.

The invention consists in having two or more rows or series of teeth of different thicknesses placed on a polygonal drum which is adjustable, it being so arranged that any of the series or rows of teeth may be adjusted in a proper relative position with the threshing cylinder as circumstances may require.

To enable those skilled in the art to fully understand and construct my invention I will proceed to describe it.

A. represents a framing, which may be constructed in any proper way to support the working parts of the machine, and B. is a cylinder which is placed on the top of the framing A. and is provided with radial teeth $a$, which are placed in longitudinal rows as usual.

In the framing A. and in an oblique direction below the cylinder B. there is placed a drum C. which may be formed by placing a head $b$, at each end of a shaft $c$, said heads having the ends of concave plates $d$, secured to them. Four plates $d$, are shown in Fig. 2, but more or less may be used. The plates $d$, are placed at equal distances apart and are of concave form in their transverse section as shown clearly in Fig. 2. The shaft $c$, with its heads $b$, $b$, and plates $d$, may be termed a polygonal drum, and each plate $d$, is provided with two longitudinal rows of teeth which are designated respectively by $e'$, $e''$, $e'''$, $e''''$, as shown in Fig. 2.

The rows of teeth on the plates $d$, vary in thickness, but the same number of teeth are employed on each plate and they are placed at the same distance apart from center to center. The variation however in the thickness of the teeth of the several plates varies the width of the spaces between them, and consequently the teeth $a$, of the cylinder B. will as the cylinder B. rotates pass nearer some teeth than others, and by having the teeth of each plate differ in thickness from any of the others, the width between the teeth $a$, of the cylinder and the stationary teeth on the plates $d$, may be varied to suit different kinds of grain and insure the perfect stripping or separating of the heads from the straw.

Each plate $d$, with its teeth is a concave and operates in precisely the same manner as the concave of an ordinary threshing machine.

The ends or journals of the shaft $c$, are fitted in oblong oblique bearings $g$, $g$, shown by dotted lines in Fig. 2, and rest on set screws $h$, $h$. By adjusting the screws $h$, $h$, the concaves may be arranged nearer to or farther from cylinder B. as may be desired. The plates or concaves $d$, are prevented from casually moving by means of a rod D. which is fitted in an upper notch $i$, of the heads $b$, $b$, the ends of the rod D. passing through the sides of the frame. There is a notch $i$, in each head $b$, between the plates $d$, and when the desired concave is adjusted relatively with cylinder B. the rod D. is inserted in the upper notches $i$, and in the sides of the frame A. one end of the rod D. being provided with a head and the other end provided with a nut. The feed board E. is fitted on this rod D.

The arrangement is extremely simple and does not involve any material addition to the cost of construction, while the advantages are important, the machine, as previously stated, being enabled to be adapted to different kinds of grain, and also adapted to suit different conditions of one and the same kind of grain—as the teeth of the cylinder should work nearer together or farther apart according as the grain is dry or moist.

Having thus described my invention what

I claim as new and desire to secure by Letters Patent is—

The employment or use in combination with a threshing cylinder B. of an adjustable drum formed of a series of toothed concaves attached to or connected with a common shaft substantially as shown, to admit of any one of a series or number of toothed concaves, having teeth of different thickness, being used with the threshing cylinder as circumstances may require.

P. H. STANDISH.

Witnesses:
SAML. H. WRIGHT,
D. GRAVES.